United States Patent [19]

Halene

[11] 4,382,324

[45] May 10, 1983

[54] METHOD OF MAKING A LIGHT-WEIGHT, TWO-WHEEL SET

[75] Inventor: Clemens Halene, Düsseldorf, Fed. Rep. of Germany

[73] Assignee: Mannesmann Aktiengesellschaft, Düsseldorf, Fed. Rep. of Germany

[21] Appl. No.: 217,047

[22] Filed: Dec. 16, 1980

[30] Foreign Application Priority Data

Dec. 13, 1979 [DE] Fed. Rep. of Germany ........ 2950565

[51] Int. Cl.³ .................................................. B21H 1/04
[52] U.S. Cl. .................................. 29/168; 295/36 R; 72/354; 72/356; 72/359
[58] Field of Search ............. 29/159 R, 159.01, 159.1, 29/159.2, 159.3, 168, 803; 72/267, 354, 356, 359, 367, 370, 377; 295/36 R, 37, 39

[56] References Cited

U.S. PATENT DOCUMENTS

| | | | |
|---|---|---|---|
| 390,811 | 10/1888 | Smith | 295/36 R |
| 560,785 | 5/1896 | Ehrhardt | 29/168 |
| 1,087,583 | 2/1914 | Hansen | 72/356 |
| 1,149,836 | 8/1915 | Kennedy | 295/36 R |
| 1,357,226 | 11/1920 | Davis | 295/36 R |
| 1,684,206 | 9/1928 | Smith | 29/159.01 |
| 1,841,920 | 1/1932 | Smith | 29/159.3 |
| 1,850,395 | 3/1932 | Hughs | 29/159.01 |
| 2,084,814 | 6/1937 | Le Jeune | 72/377 |
| 2,344,803 | 3/1944 | Criley | 72/356 |
| 2,368,695 | 2/1945 | Wilber | 72/356 |
| 2,599,706 | 6/1952 | Friedman | 29/159.3 |
| 3,237,288 | 3/1966 | Hogan et al. | 29/159.3 |
| 3,895,422 | 7/1975 | Graafsma | 29/159.2 |
| 3,927,449 | 12/1975 | Gibble | 72/267 |
| 4,213,351 | 7/1980 | Rowlinson | 72/367 |

FOREIGN PATENT DOCUMENTS

| | | |
|---|---|---|
| 544626 | 2/1932 | Fed. Rep. of Germany . |
| 864408 | 1/1953 | Fed. Rep. of Germany . |
| 864885 | 1/1953 | Fed. Rep. of Germany . |
| 876697 | 5/1953 | Fed. Rep. of Germany . |
| 963158 | 5/1957 | Fed. Rep. of Germany . |
| 2905961 | 8/1980 | Fed. Rep. of Germany ........ 72/267 |
| 55-97834 | 7/1980 | Japan ..................................... 72/356 |
| 1437238 | 5/1976 | United Kingdom .................. 72/370 |

Primary Examiner—Lowell A. Larson
Attorney, Agent, or Firm—Rahlf H. Siegemund

[57] ABSTRACT

Cylindrical blanks are formed into wheels, each with an integral shaft; and one of the shafts is shrunk into the other one in order to complete the set. Each wheel may have an integral, outwardly extending bearing hub.

4 Claims, 6 Drawing Figures

METHOD OF MAKING A LIGHT-WEIGHT, TWO-WHEEL SET

BACKGROUND OF THE INVENTION

The present invention relates to a set of light-weight wheels having a hollow axle and journal means.

Twin wheels, or two-wheel sets, are mostly constructed in that two individual wheels are forced onto a solid axle. The resulting assembly is heavy, requires extensive additional work, and complicated steps are to be taken for tests. Also, the press fit zone experiences maximum load and wear.

German Pat. Nos. 876 697 and 963 158 disclose such wheels in which the axle is of a hollow construction. However, these types of wheels do not withstand present-day load requirements. Early material fatigue can be observed in certain cross sections of the axle particularly adjacent to the press fit area. Cracks and fractures result from this high sensitivity to notching. These facts have been recognized and lead to constructions as shown in German Pat. Nos. 864 885 and 864 408, according to which press fit was replaced by welding the hollow shaft to the wheel. However, repetition of bending stress leads to early damage of the weld joint.

Following the general teaching of the early German Pat. Nos. 544 626, it has been proposed to shrink fit wheels onto a tubular carrier, and a forced internal sizing bushing is used to stabilize the press fit on the hollow shaft. It has been tried to reduce stress peaks in this construction by means of adhesive bonding, under elimination of the press fit. However, this approach requires too many parts and light working tolerances.

DESCRIPTION OF THE INVENTION

It is an object of the present invention to provide a new and improved light-weight wheel set for rail vehicles under utilization of a hollow shaft or axle.

It is another object of the present invention to provide a new and improved method of making light-weight wheel sets.

In accordance with the preferred embodiment of the present invention, it is suggested to provide a wheel set by combining two individual wheels, each having an integral hollow shaft; and the two shafts are telescoped one into the other and joined in a shrink fit. Each wheel may, in addition, be provided with an integral, hollow hub, serving as a bearing on the outside of the wheel set; or bearing bushings may be provided on each of the hollow shafts, to serve as bearings on the inside of the set.

The wheel set made in accordance with the invention has a joint in the middle portion of the hollow shaft which region is not critical, particularly upon repeatedly exerting bending stress thereupon. Moreover, the shaft joint is not, or only insignificantly, subjected to axial thrust. Bearing elements and brake disks can be mounted from the inside of the assembly, prior to joining the shafts, and do not require removal of the wheels. The danger of cracks in the transition region of the wheel axle is drastically eliminated due to natural and continuous grain texture in each integral wheel shaft subcombination. Additional advantages result from the low cost of manufacturing, generally simple maintenance, including interior tests, and ease of mounting and assembly.

As will be explained with reference to the drawing, the making of the set of wheels is comprised of a plurality of deforming steps under utilization of appropriate dies. A cylindrical blank is provided with a shell portion and one or two short, tubular ends. The latter are worked into shafts, while the shell is stepwise worked into a wheel disk.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings, FIG. 1 shows a pair of press dies 2 and 3 for forming a cylindrical blank 1 into a preliminary shape. This blank 1 has been heated to forging temperature and descaled. Die 2 has a punch-like protrusion which redistributes the blank material in axial direction in order to form a conical, short shaft or pin-like portion 5 which is solid. Also, a shorter conical portion 6 extending in opposite direction is formed. As can be seen from the drawings, the conical portion 6 can also be termed "a pin-like portion". Finally, a cylindrical shell portion 7 is formed by the punch 4 in cooperation with the appropriately contoured cavity in die member 3.

FIG. 2 illustrates another pair of die members 8 and 9, by means of which the cylindrical sheell 7 is conically deformed. Subsequently (or earlier), an extrusion punch or mandrel 10 is inserted into an opening or bore of die member 8 and forms the short cylindrical portion 5 into a hollow 12. The front portion of mandrel 10 is constructed for serving as a piercing tool in order to form portion 6 into a short, hollow hub 13.

FIG. 3 shows another pair of dies, 14 and 15, which shapes the conically deformed shell 7 into one of a rather wide apex angle; this part is, thus, provided with a predominantly radial extension. Subsequently or earlier, tubular part 12 is drawn in and upset crimped by means of a reducing punch which cooperates with another portion of hollow die 14 resulting in a shaft end 16 of reduced diameter.

It should be mentioned that elements 26, 27, 28, and 29 in the preceding figures are ejectors for removing the respective completed shape from the dies.

Figures 1, 2, 3:
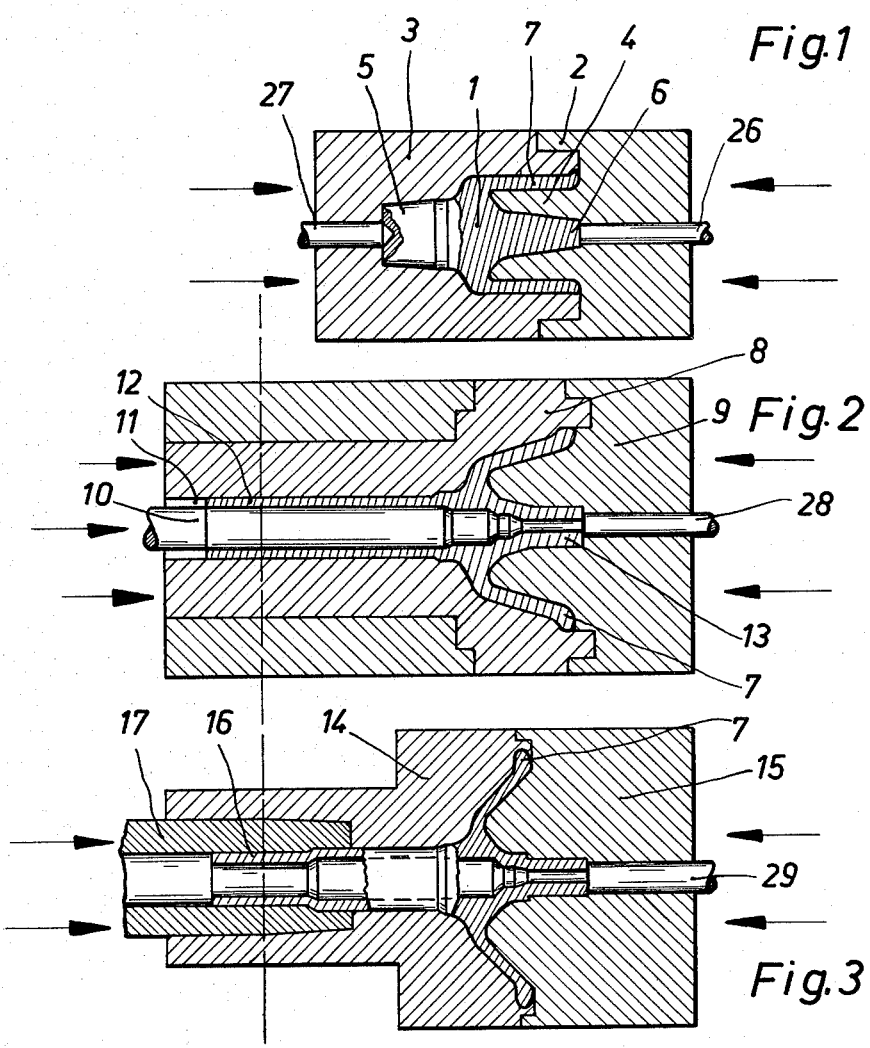
FIGS. 1, 2, and 3 are cross sections through various pieces of equipment for illustrating the process steps fo shaping a blank into an integral product being one-half of a two-wheel set.
Figure 4:
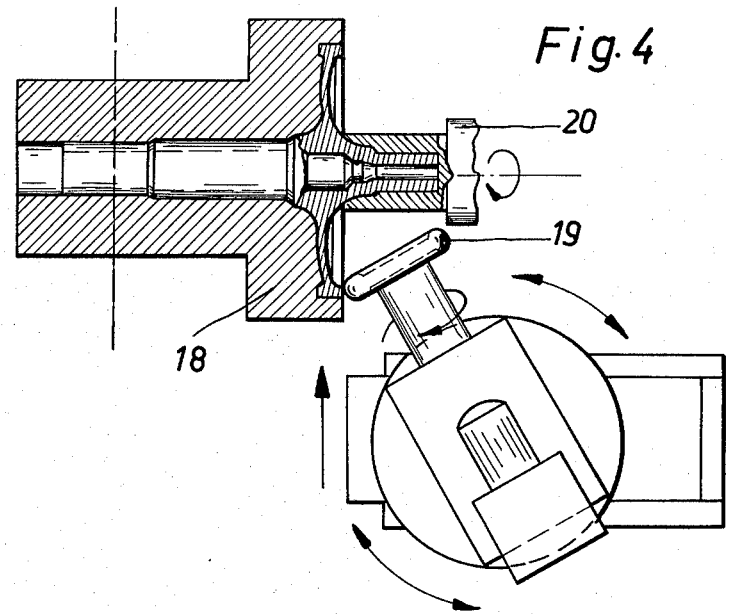
FIG. 4 illustrates in section and side view the rolling of a portion of the wheel.

FIG. 4 illustrates the last one of the hot working steps, using a sizing die 18 which cooperates with a roll 19 in a combination of spinning and rolling in order to roll the shell part 7 finally into a disk. Numeral 20 refers to an axial support of axle element 13.

Figure 5:
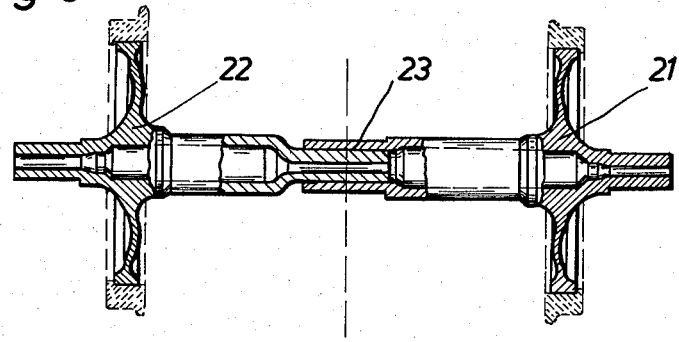
FIG. 5 is a section through a complete, two-part wheel set.

FIG. 5 illustrates two wheels 21 and 22 with integral shafts. The wheels are of similar construction, except that the shafts have at their outer ends different diameters to be telescoped into each other in a press or shrink fit joint 23. This step completes the two-wheel set.

Figure 6:
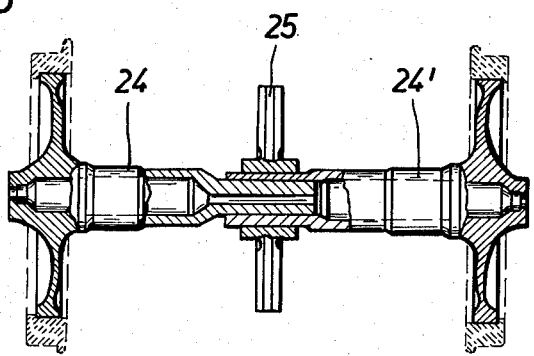
FIG. 6 shows a modified set with brake disks and inside bearings.

FIG. 6 illustrates the addition of bearing bushings 24 and 24' on the inside as well as the provision of a brake disk 25. This set of wheels is made from elements which do not have an outer bearing hub.

It can readily be seen that the assembly as made from two integral parts exhibits no joints between shaft and wheel. Rather, the two shafts are joined in a middle portion of what is thereafter a single hollow shaft. The grain material texture is, thus, flow-distributed in the transition zone from wheel to shaft. The shaft joint will experience some bending stress, of course, but that middle portion is not at all critical.

The invention is not limited to the embodiments described above, but all changes and modifications thereof not constituting departures from the spirit and scope of the invention, are intended to be included.

I claim:

1. A method of making a light-weight, two-wheel set, comprising the steps of
    press-working in a die a cylindrical blank into a shell and short, conical tube;
    stepwise forming the shell into a cone;
    working the conical tube into a tubular shaft that remains integral with the shell and cone;
    shortening the tube;
    rolling the cone into a disk;
    repeating the preceding steps on a different blank in order to obtain a disk with an integral shaft of different diameter; and
    telescoping one of the shafts into the other one in order to obtain the two-wheel set.

2. A method of making a light-weight wheel to be combined with another to obtain a two-wheel set, comprising the steps of
    press-working in a die a cylindrical blank into a shell from which a solid conical pin-like portion extends, from the inside of the shell, and a second pin-like portion extends opposite thereto, from the outside of the shell;
    radially deforming the shell to obtain a shallow angle cone;
    axially press-working the pins to obtain a hollow shaft from which the shell extends, the hollow shaft having different cross sections; and
    rolling the cone into a wheel disk.

3. The method as in claim 2, the axial pressworking of the second pin-like portion including the formation of a relatively long tube and of subsequently shortening the tube under formation of different internal cross sections.

4. The method as in claim 2, the rolling step being carried out on one side of the shallow cone, the other side of the shallow cone being supported.

* * * * *